(12) United States Patent (10) Patent No.: US 7,852,216 B2
Roesner (45) Date of Patent: Dec. 14, 2010

(54) BACKSCATTERING DIFFERENT RADIO FREQUENCY PROTOCOLS

(75) Inventor: Bruce B. Roesner, Durham, NC (US)

(73) Assignee: Sirit Technologies Inc., Toronto (CA)

( * ) Notice: Subject to any disclaimer, the term of this patent is extended or adjusted under 35 U.S.C. 154(b) by 586 days.

(21) Appl. No.: 11/842,556

(22) Filed: Aug. 21, 2007

(65) Prior Publication Data

US 2009/0051533 A1 Feb. 26, 2009

(51) Int. Cl.
 *G08B 13/14* (2006.01)
(52) U.S. Cl. .................................. 340/572.1
(58) Field of Classification Search ............... 340/572.1
 See application file for complete search history.

(56) References Cited

U.S. PATENT DOCUMENTS 6,515,919 B1 * 2/2003 Lee ........................... 365/192
6,577,302 B2 * 6/2003 Hunter et al. ............... 345/204
2002/0000841 A1 * 1/2002 Rai et al. ...................... 327/56
2005/0174239 A1 * 8/2005 Shanks et al. ............ 340/572.1

* cited by examiner

*Primary Examiner*—George A Bugg
*Assistant Examiner*—Naomi Small
(74) *Attorney, Agent, or Firm*—Fish & Richardson P.C.

(57) ABSTRACT

The present disclosure is directed to a system and method for backscattering different radio frequency protocols. In some implementations, a radio Frequency (RF) tag includes an antenna and a storage module. The antenna is configured to receive an RF signal from any of a plurality of readers. Each reader is associated with a different protocol having different time durations. The storage module is coupled to the antenna and configured to store energy associated with the RF signal. In addition, the storage module substantially maintains a voltage in the tag during any of the different time durations independent of an internal power supply.

22 Claims, 7 Drawing Sheets

BACKSCATTERING DIFFERENT RADIO FREQUENCY PROTOCOLS

TECHNICAL FIELD

This invention relates to detecting Radio Frequency (RF) signals and, more particularly, to backscattering different RF protocols.

BACKGROUND

In some cases, an RFID reader operates in a dense reader environment, i.e., an area with many readers sharing fewer channels than the number of readers. Each RFID reader works to scan its interrogation zone for transponders, reading them when they are found. Because the transponder uses radar cross section (RCS) modulation to backscatter information to the readers, the RFID communications link can be very asymmetric. The readers typically transmit around 1 watt, while only about 0.1 milliwatt or less gets reflected back from the transponder. After propagation losses from the transponder to the reader the receive signal power at the reader can be 1 nanowatt for fully passive transponders, and as low as 1 picowatt for battery assisted transponders. At the same time other nearby readers also transmit 1 watt, sometimes on the same channel or nearby channels. Although the transponder backscatter signal is, in some cases, separated from the readers' transmission on a sub-carrier, the problem of filtering out unwanted adjacent reader transmissions is very difficult.

As an example, the readers 104 may support one or more of the following procotols: ISO/IEC 14443, 15693 and 18000-3 standards of 13.56 MHz high frequency (HF) RFID interface, all or some options of ECMA-340 13.56 MHz Near Field Communication (NFC) interface, all or some options of ISO/IEC 18000-2 standard and other variations of 100-150 kHz low frequency (LF) RFID interfaces, ISO/IEC 18000-4 standard of 2.45 GHz ultra high frequency (UHF) RFID interface, ISO/IEC 18000-6 standard of 860-960 MHz UHF RFID interface, ISO/IEC 18000-7 standard of 433 MHz UHF RFID interface, and/or others.

SUMMARY

The present disclosure is directed to a system and method for backscattering different radio frequency protocols. In some implementations, a radio Frequency (RF) tag includes an antenna and a storage module. The antenna is configured to receive an RF signal from any of a plurality of readers. Each reader is associated with a different protocol having different time durations. The storage module is coupled to the antenna and configured to store energy associated with the RF signal. In addition, the storage module substantially maintains a voltage in the tag during any of the different time durations independent of an internal power supply.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
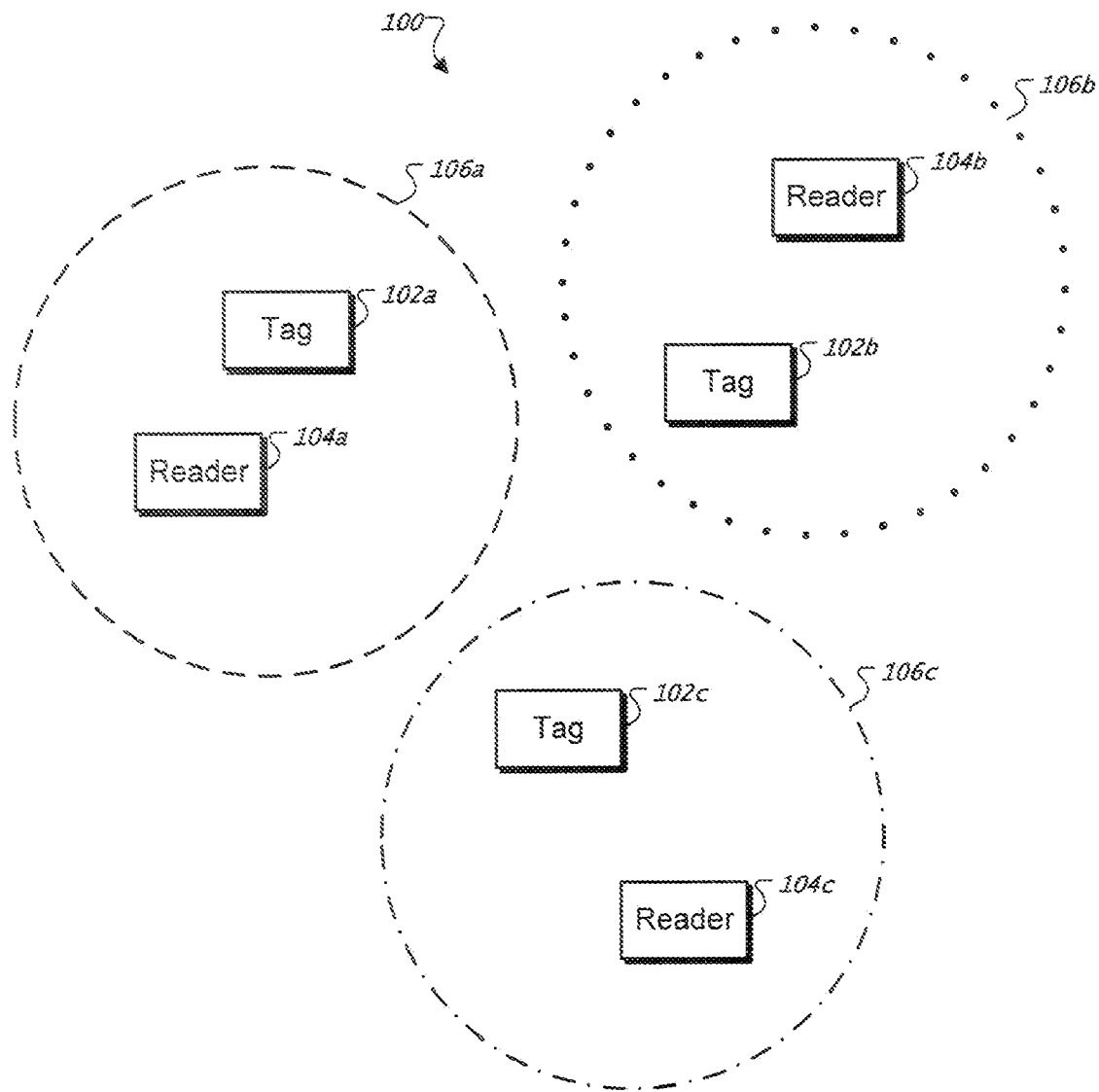
FIG. 1 is a block diagram illustrating an example communication system in accordance with some implementations of the present disclosure.

FIG. 1 is a block diagram illustrating an example system 100 for providing multi-protocol support in accordance with some implementations of the present disclosure. RFID protocols define a set of rules for communication between RFID tags and readers. For example, the RFID protocols may define time durations when passive RFID tags are not receiving RF signals from a reader and use internally stored power to operate during such durations. In some implementations, the system 100 may transmit a reply to a received signal using powered stored from the received signal. In other words, the system 100 may transmit replies to signals independent of an internal power source, which is typically referred to as backscattering. For example, the system 100 may include passive tags 102a-c that do not include an internal power supply. In this case, the passive tags 102a-c backscatter signals independent of an internal power supply. In order to maintain operation when a signal is not being received, the passive tags 102 store power from previously received signals to use during these time durations. In some implementations, the system 100 uses different communication protocols that have different time durations (e.g., 30 μs, 50 μs). In these implementations, the tags 102 operate during these time durations without receiving power from RF signals. To operate during such time durations, the tag 102 can, in some implementations, maintain a certain Direct Current (DC) voltage level to operate the tag 102 including transmitting responses. In the illustrated implementations, the passive tags 102 are configured to operate during a plurality of different time durations. In doing so, the passive tags 102 can backscatter signals using a plurality of different RFID protocols.

At a high level, the system 100 includes the passive tags 102a-c communicably coupled with RF readers 104a-c using different communication protocols. As mentioned above, RFID protocols define time durations when power on an antenna is effectively removed, i.e., RF signals sufficient to power the tag 102 are not being received from an RF reader 104. During these time durations, the passive tags 102 operate using power stored from previously received RF signals. Such duration times can, in some implementations, be different for different protocols. For example, a protocol used by reader 104a may have a time duration of 20 microseconds (μsec) while the time duration for the reader 104b may have a time duration of 10 μsec. in some implementations, the tags 102a-c are configured to operate during a plurality of different time durations. In other words, the tags 102a-c can transmit responses in accordance with a plurality of different protocols. In some implementations, the tags 102a-c can include a plurality of capacitors that are selectively switched to substantially maintain a voltage in the tag 102 above a reset voltage for any of the different time durations. For example, the tags 102 may be switched in a first configuration when the capacitors are being charged and switched to a second configuration when the capacitors are being discharged.

The RFID tags 102 include any software, hardware, and/or firmware configured to backscatter RF signals in accordance with multiple protocols. In some implementations, the tags 102 can alternate between absorbing power from signals transmitted by the readers 104 and transmitting responses to the signals using at least a portion of the absorbed power. In passive tag operation, the tags 102 typically have a maximum allowable time to maintain at least a minimum DC voltage level. In some implementations, this time duration is determined by the amount of power available from an antenna of a tag 102 minus the power consumed by the tag 102 to charge the on-chip capacitance. In some instances, the tag 102 uses capacitors to store power for use during different time durations. The effective capacitance can, in some implementations, be configured to store sufficient power to support the internal DC voltage when the antenna power is disabled. The tag 102 may consume the stored power when information is either transmitted to the tag 102 or the tag 102 responds to the reader 104 (e.g., modulated signal on the antenna input). For a given communication protocol, an operating capacitance for the tag 102 can be determined in order to maintain the DC voltage when power is disabled. Such capacitance can be determined using the following first order equation:

Current=Capacitance×change in voltage/change in time

In some implementations, the tag 102 can support protocols having charge-storage requirements that do not overlap. For example, protocol "A" might have time durations of only 1 usec, when power on the antenna is removed, and the tag 102 may be powered for 20 usec. In this example, received signals may supply 50 $\mu$A where the elements of the tag 102 consume 20 $\mu$A, so a net current of 30 $\mu$A is left for charging the internal storage. For this example protocol, the effective capacitance can be determined to be between 200 pF and 300 pF. In the case that the tag 102 supports a second protocol "B" that has time durations of 10 usec, an operating storage capacitance of 2,000 pF can be determine, which is outside the requirements of protocol "A". In this example, the tag 102 may program storage capacitors such that the internal voltage is not disrupted when operating in accordance with the protocol A and B.

In transmitting the responses, the tags 102 may include one or more of the following: an identification string, locally stored data, tag status, internal temperature, and/or others. In some implementations, the tags 102 can transmit the response in one of a plurality of time slots in a time duration. As mentioned above, the tags 102 use power stored from the signal transmitted by the reader 104 to power the transmission of the response in the time slot. In some implementations, the tags 102 may include a plurality of capacitors selectively switched to maintain the voltage rail above at least a certain voltage, such as the reset voltage. For example, the tags 102 may selectively switch between capacitors to maintain a voltage between about 1.9 Volts (V) and 2.1 V during a time duration, i.e., during a period of time when the tags 102 are not receiving a signal. In some implementations, the tags 102 include a plurality of capacitors in parallel that are sequentially switched when absorbing power and/or backscattering signals. In some implementations, the tags 102 include a plurality of transistors in parallel to selectively switch between the capacitors. In some implementations, tags 102 can limit the current through the switches to prevent, minimize, or otherwise reduce rapid changes to the voltage rail. If the current is not limited in the tag 102, the voltage on the rail can, in some implementations, transition rapidly to a value set by the voltage division of the two capacitors. For example, a switched capacitor with a value of 1 C may cause the voltage to suddenly drop by 25% when connected to a storage capacitor of 3 C value. By limiting the current in tag 102, the change in the voltage on the rail can be susbtantially controlled.

The RFID readers 104 include any software, hardware, and/or firmware configured to transmit and receive RF signals in accordance with different protocols. In general, the RFID reader 104 may transmit request for information within a certain geographic area associated with the reader 104, i.e., interrogation zones 106. The reader 104 may transmit the query in response to a request, automatically, in response to a threshold being satisfied (e.g., expiration of time), as well as others. The interrogation zone 106 may be based on one or more parameters such as transmission power, associated protocol, nearby impediments (e.g., objects, walls, buildings), as well as others. In some implementations, the RFID reader 104 can set a certain number of time slots when transmitting queries to the associated interrogation zones 106. In some cases, the RFID reader 104 can dynamically adjust the number of time slots that tags 102 can respond based, at least in part, on previous responses. In general, the RFID reader 104 may include a controller, a transceiver coupled to the controller, and at least one RF antenna coupled to the transceiver (not illustrated). In this example, the RF antenna transmits commands generated by the controller through the transceiver and receives responses from RFID tags 102 in the associated interrogation zone 106. In some implementations, the controller can determine statistical data based, at least in part, on tag responses. The readers 104 often includes a power supply or may obtain power from a coupled source for powering included elements and transmitting signals. In some implementations, the reader 104 operates in one or more of frequency bands allotted for RF communication. For example, the Federal Communication Commission (FCC) have assigned 902-928 MHz and 2400-2483.5 MHz as frequency bands for certain RFID applications. In some implementations, the reader 104 may dynamically switch between different frequency bands. In transmitting queries, the reader 104 can, in some implementations, assign one or more tags 102 to a slot for responding to a query. In some implementations, the reader 104 can transmit, in a query, information identifying a certain number of slots such that the receiving tag 102 selects one of the slots based, at least in part, on the information. In some implementations, the readers 104 cease transmitting signals during those slots, and as a result, the passive tags 102 are not receiving power from the reader transmissions.

In one aspect of operation, the reader 104 periodically transmits signals in the interrogation zone 106. In the event that the tag 102 is within the interrogation zone 106, the passive tag 102 processes the signal and stores at least a portion of the power of the received signal. In some implementations, the passive tag 102 may store power in a plurality of capacitors. In response to the initiation of a time duration, the passive tag 102 uses the stored power to operate elements include transmitting a response to the reader 104. In some implementations, the tag 102 selectively switches capacitors in accordance with a protocol associated with the reader 104 to substantially maintain an operating voltage of the tag 102. In the illustrated implementation, the passive tag 102 may substantially maintain an operating voltage during the different time durations associated with the readers 104*a-c*.

Figure 2:
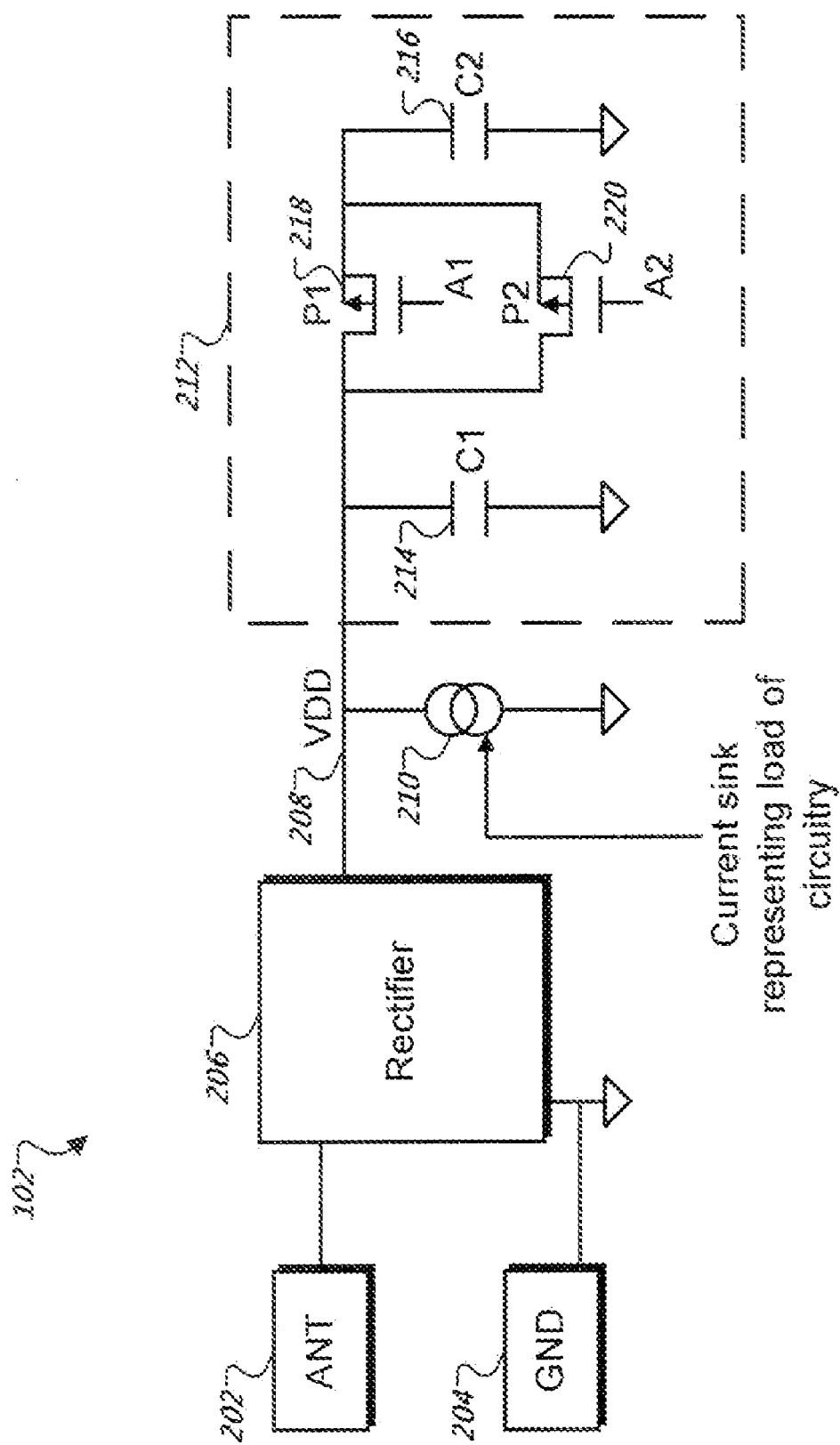
FIG. 2 is a block diagram illustrating an example passive tag of FIG. 1.

FIG. 2 illustrates an example tags 102 of FIG. 1 in accordance with some implementations of the present disclosure. In particular, the illustrated tag 102 selectively switches between capacitors to maintain an operating voltage for different communication protocols. As mentioned above, the tag 102 discharges power based, at least in part, on a protocol associated with the received signal. In addition, the example tag 102 can selectively switch transistors to regulate current during charging and discharging of the capacitors.

The tag 102 includes any software, hardware, and/or firmware configured to wirelessly communicate RF signals in accordance with a plurality of protocols. In the illustrated implementation, the tag 102 includes an antenna 202, a ground 204, a rectifier 206, a VDD 208, a current sink 208, and a storage module 210. Though, the tag 102 may include some, all, additional, or different elements without departing from the scope of this disclosure. For example, the tag 102 may include a controller, memory, regulators, sensors, charge pumps, and/or others. The antenna 202 wirelessly receives RF signals from the readers 104 and transmits RF signals to the readers 104. For example, the antenna 202 may receive, from a reader 104, a query for information associated with the tag 102, and in response to at least the inquiry, the tag 102 transmits information including an identifier to the reader 104. The ground 204 provides a reference voltage level for other voltages in the tag 102 that are measured and/or established.

The antenna 202 passes received RF signals to the rectifier 206. The rectifier 206 converts the incoming alternating signal, i.e., the RF signals, to Direct Current (DC) signals. The rectifier 206 passes the DC signal to the VDD 208, which provides the DC signal to other elements for processing (not illustrated). The voltage module 212 stores at least a portion of the energy of the received signal for operating the tag 102 during time durations. In some implementations, the voltage module 212 substantially maintains the voltage of the VDD 208 during the time duration of the protocol associated with the received signal. For example, the voltage module 212 may maintain the voltage of the tag 102 during the time duration above a reset voltage (e.g., 1.7 V) to prevent or otherwise reduce the likelihood that the tag 102 resets. In some implementations, the voltage module 212 maintains the voltage of the tag 102 between 1.9 V and 2.1 V independent of an internal power supply. As mentioned above, the voltage module 212 stores a portion of the power for transmitting a response during the slot time using the at least a portion of the current induced by the received signal. The current sink 210 also uses a portion of the induced current to drive the execution of other elements (e.g., controller) in the tag 102.

In the illustrated implementation, the voltage module 212 includes a first capacitor (C1) 214, a second capacitor (C2) 216, a first transistor (P1) 218, and a second transistor (P2) 220. In this example, the first capacitor 214 and the second capacitor 216 are connected in parallel with the VDD 208. The first transistor 218 and the second transistor 220 are also connected in parallel and are selectively switched during charging and discharging to substantially maintain the current of the VDD 208 during the time duration.

In one aspect of operation, a received signal initially charges the first capacitor 214 while the first transistor 218 and the second transistor 220 are closed. In response to at least the first capacitor 214 becoming fully charged, the first transistor 218 may be opened while the second transistor 220 remains closed while charging the second capacitor 216. In this example, having the second transistor 220 closed during charging eliminates, minimizes, or otherwise reduces charge being transferred from the first capacitor 214 to the second capacitor 216. During the discharging of the first capacitor 214 and the second capacitor 216, both the first transistor 218 and the second transistor 220 can, in some implementations, be opened to substantially maintain the current below a certain threshold current.

Figure 3:
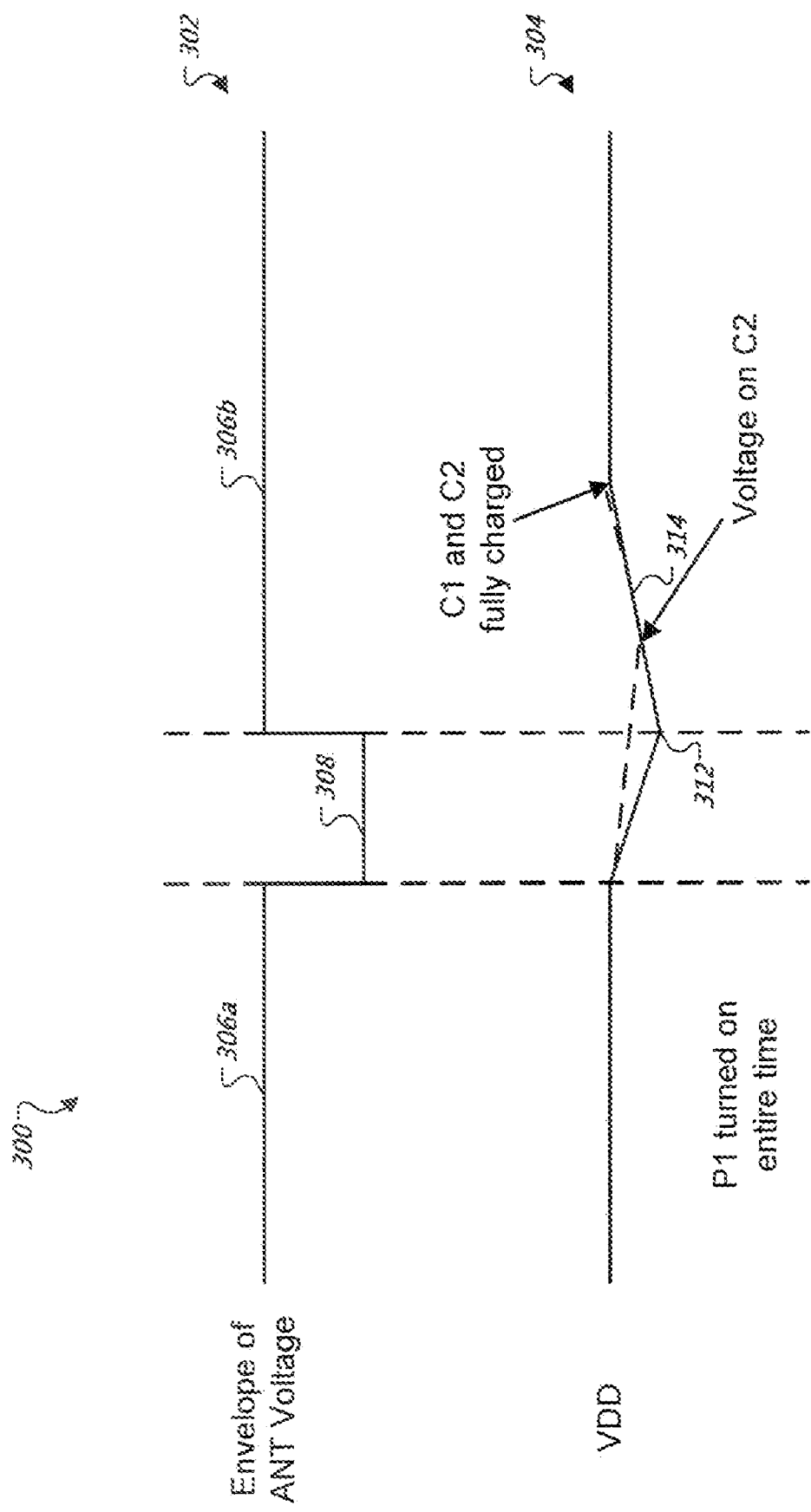
FIG. 3 is an example graph of voltage in the antenna and tag of FIG. 2.

FIG. 3 illustrates an example voltage diagram 300 of the tag 102 in FIG. 2. In this example, the diagram 300 plots voltage as a function of time for the antenna 202 and the VDD 208. As mentioned above, an RF signal received by the tag 102 induces a voltage in the antenna 202, as illustrated in the diagram 302. In some implementations, the RF signal may transmit intermittently which results in the induced voltage switching between a high and a low induced voltage. For example, the low voltage may substantially equal zero. The high voltage is illustrated by plateaus 306a and 306b, and the low voltage is illustrated by a valley 308. In some implementations, the valley 308 corresponds to a time duration for the associated protocol. As mentioned above, the voltage module 212 substantially maintains the voltage on the VDD 208 during this time duration. In reference to FIG. 2, the capacitors 214 and 216 store energy induced by a received signal and discharge energy stored energy during the time duration to substantially maintain the voltage in the VDD 208. During discharging, both the transistor 218 and 220 can be switched open so both the capacitors 214 and 216 discharge to substantially maintain the voltage on the VDD 208, as illustrated by the switching point 312. In response to at least receiving an RF signal, the transistor 218 and 220 are switched off to initially charge the capacitors 214. In response to at least charging the first capacitor 214, the transistor 218 is switched opened to charge the second capacitor 216. The charging of the first capacitor 214 and second capacitor 216 are illustrated by portion 314. Both the first transistor 218 and the second transistor 220 may be opened to maintain the current below a certain threshold. In some implementations, the voltage on the VDD 208 is substantially maintained between an interval such as 1.9 V to 2.1 V.

Figure 4:
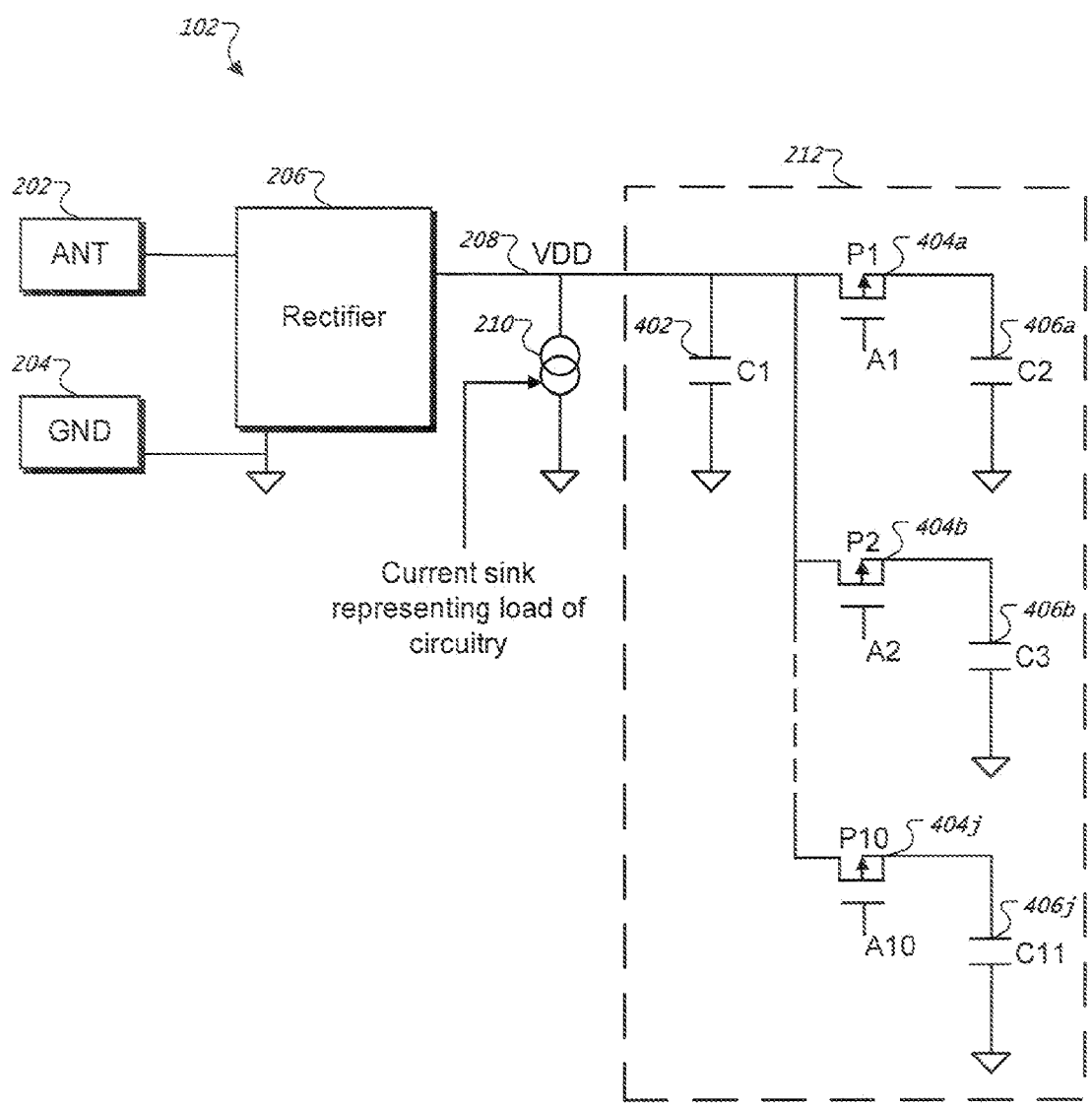
FIG. 4 is a block diagram illustrating an example passive tag of FIG. 1.

FIG. 4 illustrates another example of the tag 102 of FIG. 1 in accordance with some implementations of the present disclosure. In this implementation, the tag 102 includes the antenna 202, the ground 204, the rectifier 206, the VDD 208, the current sink 208, and the storage module 210. The illustrated storage module 212 includes an initial capacitor 402, a plurality of capacitors 404a-404j, and a plurality of transistors 406a-406j. In this case, the capacitors 402 and 404a-404j are connected in parallel to the VDD 208. Charging and discharging of the capacitors 404a-404j can be controlled using the transistors 406a-406j. For example, the transistors 406 may be sequentially switched on to sequentially charge associated capacitors 404. During discharge, the transistors 406 may be switched open to discharge from the capacitors 402 and 404a-404j during time durations. In some implementations, the initial capacitor 402 comprises 500 pF and subsequent capacitors 404a-j are 300 pF. In the illustrate implementation, the tag 102 includes 10 switches 406 and 10 subsequent capacitors 404. In some implementations, the transistors 406 limit the current in the VDD 208 to 5 μamps. The transistors 406 may be switched based on any suitable interval (e.g., 100 μsec). In the case that the tag is operating with 500 pF, the maximum time durations can, in some implementations, be 3.3 μsec. In the case that the tag 102 is operating with 3,500 pF, the maximum time durations can, in some implementations, be 25 μsec without power.

In one aspect of operation, a received signal initially charges the capacitor 402 while the transistors 406 are closed. In response to at least the capacitor 402 becoming fully charged, the transistor 404a may be opened while the remaining transistors 404b-j remain closed to charge the capacitor 406a. In response to at least the capacitor 404a becoming fully charged, the transistor 404b is opened with the remaining transistors 404c-j remain closed to charge the capacitor 406b. The remaining transistors 404c-j may analogous switched to sequentially charge the remaining capacitors 406c-j. By having some of the transistors 404 associated with uncharged capacitors 406 closed, the tag 102 eliminates, minimizes, or otherwise reduces losing charge from previously charged capacitors 402 and 406. In addition, the transistors 404 may be selectively opened to substantially maintain a current in the VDD 208. In some implementations, the current through the transistors 404 can be limited to prevent, minimize, or otherwise reduce rapid changes to the VDD 208. If the current is not limited through the transistors, the voltage on the VDD 208 can, in some implementations, transition rapidly to a value set by the voltage division of the capacitors 402 and 406. For example, a switched capacitor 406 with a value of IC may cause the voltage to suddenly drop by 25% when connected to a storage capacitor 406 of 3 C value. By limiting the current through the transistors 404, the change in the voltage on the VDD 208 can be substantially controlled.

Figure 5:
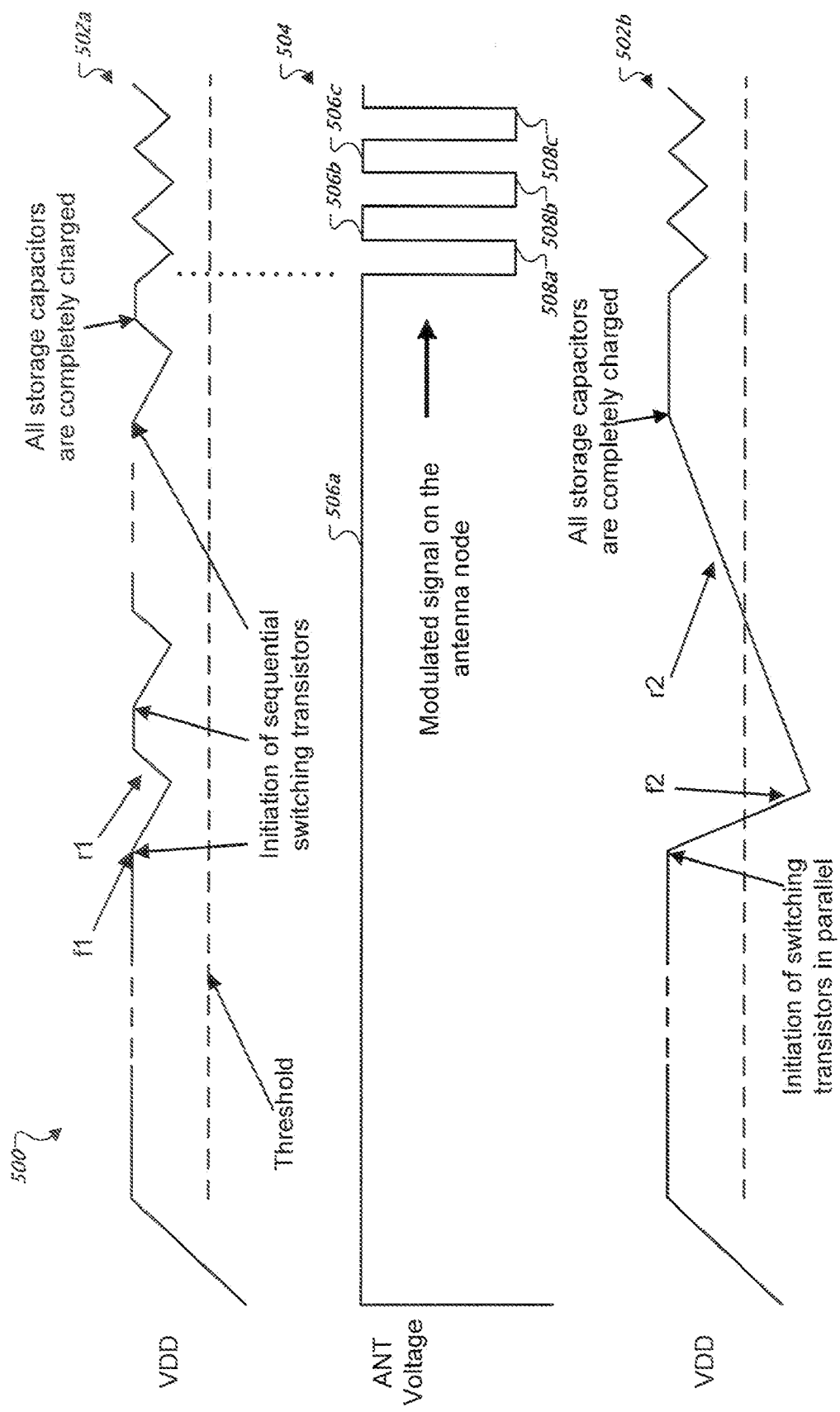
FIG. 5 is an example graph of voltage in the antenna and tag of FIG. 4.

FIG. 5 illustrates an example voltage diagram 500 of the tag 102 in FIG. 4. In this example, the diagram 300 plots voltage as a function of time for the antenna 202 and the VDD 208. In particular, the diagram 500 includes a VDD graph 502 and an antenna graph 504. The VDD graph 502 illustrates voltage on the VDD 208 as the capacitors 402 and 404 are charged using induced current based, at least in part, on received RF signals and/or discharged when transmitting responses to the readers 104. The antenna graph 202 illustrates voltage induced by received RF signals. In some implementations, the RF signal may transmit intermittently or alternate between a high and a low signal (e.g., zero), which results in the induced voltage switching between a high and a low induced voltage. The high voltage is illustrated by plateaus 506a-c, and the low voltage is illustrated by valleys 508a-c. In some implementations, valleys 508 corresponds to time durations for the associated protocol. As mentioned above, the voltage module 212 substantially maintains the voltage on the VDD 208 during the time duration. In the reference to FIG. 4, the capacitors 402 and 406a-j can, in some implementations, be sequentially charged. In some implementations, sequentially turning on transistors 404 to charge multiple capacitors 406 rather than turning them on at one time (equivalent to having only one transistor and one large capacitor) can provide advantages. If all were transistors 404 were on simultaneously, the voltage on the VDD 208 would decrease at a much more rapid rate as illustrated (see 502b). In this example, if all 10 transistors 404 were turned on simultaneously, the voltage would drop at 10 times the rate of the individual switches being sequentially turned on, which could cause VDD to fall below its threshold. The falling slope of the 10 switches turned on simultaneously (f2) may be 1.0 times an individual switch (f1). However, the rising slope of the transistors switched simultaneously (r2) may be only 1/10the slope of r1 since all 10 capacitors are being charged in parallel. In this example, the transistors 404a-j are sequentially switched on in response to at least a previous capacitor 404 being substantially charged. During discharge, the transistors 404 associated with the charged capacitors 406 are open to substantially maintain voltage on the VDD 208.

Figure 6:
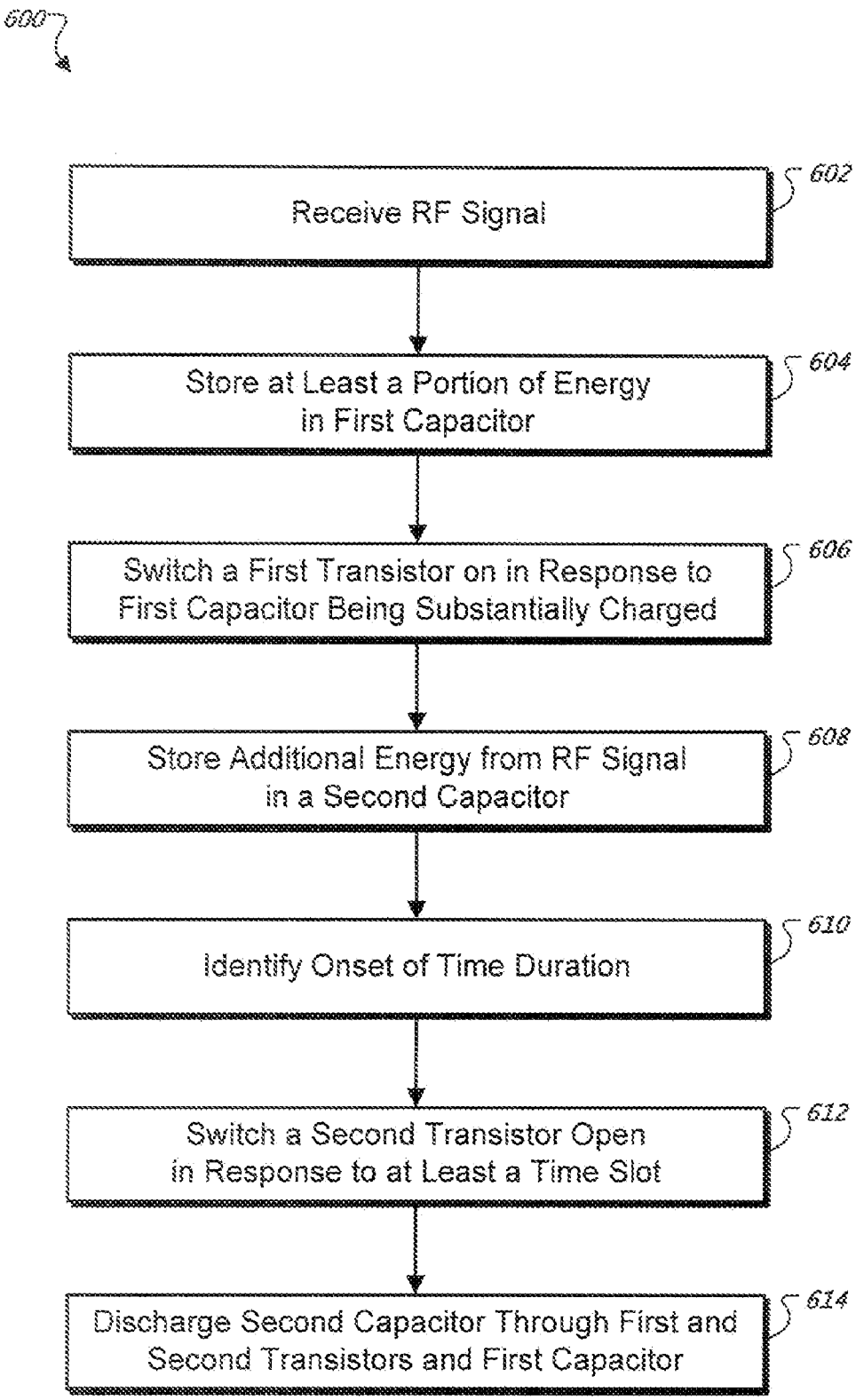
FIG. 6 is a flow chart illustrating an example method for substantially maintaining a voltage in the tag of FIG. 2.

FIG. 6 is a flowchart illustrating an example method 600 for managing a voltage in a tag 102 of FIG. 2. Generally, the method 600 describes an example technique for operating a tag 102 in accordance with multiple protocols with different time durations. In particular, the method 600 describes a technique where the two transistors in parallel are selectively switch to charge and discharge two capacitors in parallel. The tag 102 may use any appropriate combination and arrangement of logical elements implementing some or all of the described functionality.

Method 600 begins at step 602 where an RF signal is received. For example, the antenna 202 may receive an RF signal from a reader 104. At step 604, at least a portion of the energy of the received RF signal is stored in a first capacitor. In the example, a portion of the energy may be stored in the capacitor 214. Next, a first transistor is switched opened in response to at least the first capacitor being substantially charged at step 606. As for the example, the transistor 218 can be switched opened in response to the capacitor 214 being charged. In some implementations, the transistor 220 remains closed to reduce the likelihood that charge is transferred from the capacitor 214 to the capacitor 216. At step 608, additional energy from the received signal is stored in the second capacitor. Returning to the example, additional energy from the received RF signal is stored in the capacitor 216. Next, at step 610, the onset of the time duration is identified and, at step 612, a second transistor is opened. As for the example, the transistor 220 is opened in response to at least a time duration to substantially maintain power in the VDD 208. At step 614, the second capacitor through the first and second transistors and the first capacitor are discharged to maintain voltage.

Figure 7:
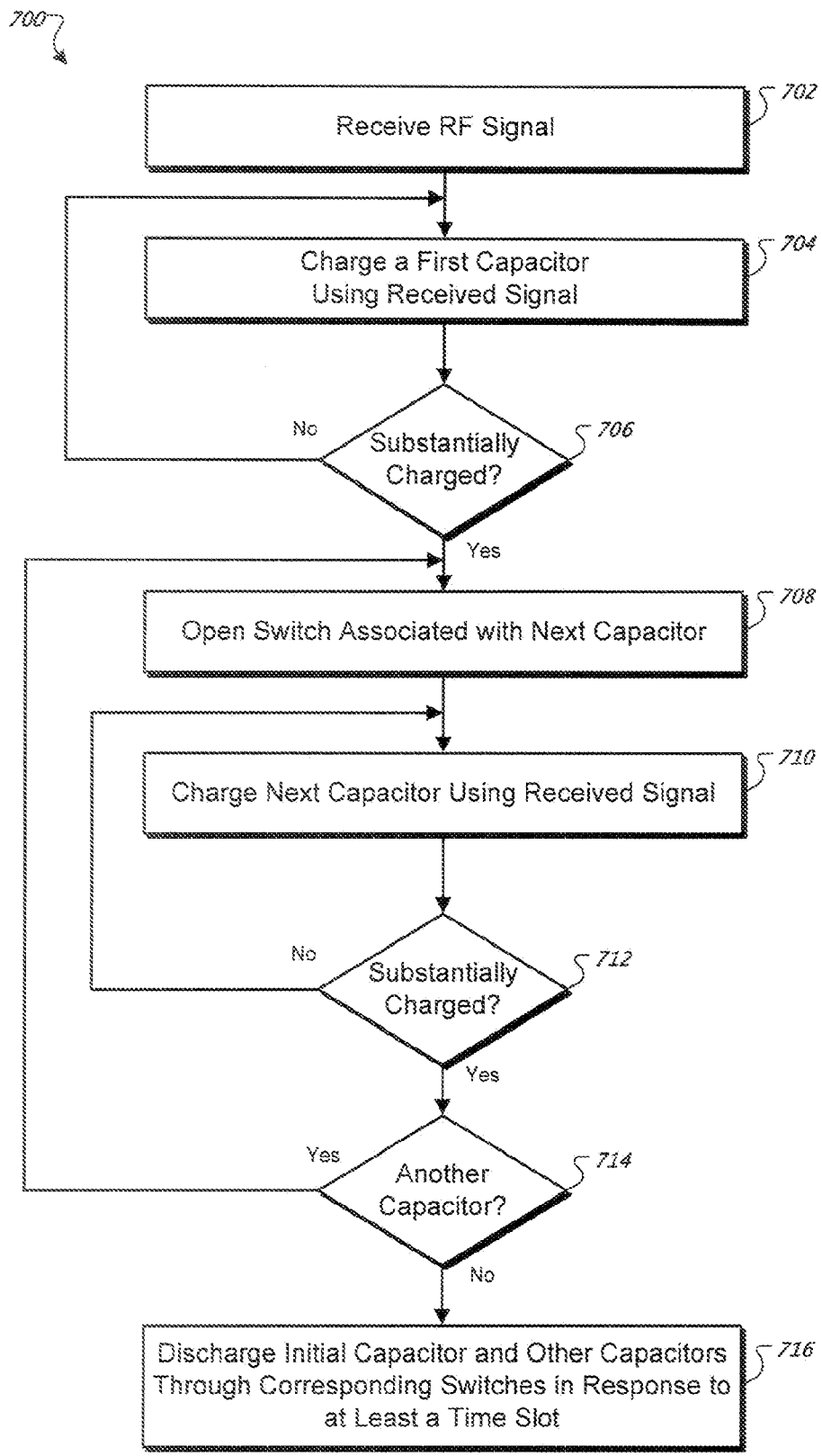
FIG. 7 is a flow chart illustrating an example method for substantially maintaining a voltage in the tag of FIG. 4.

FIG. 7 is a flowchart illustrating an example method 700 for substantially maintaining a voltage in a tag 102 of FIG. 4. Generally, the method 700 describes an example technique for operating a tag 102 in accordance with multiple protocols with different time durations. In particular, the method 600 describes a technique where the two transistors in parallel are selectively switch to charge and discharge two capacitors in parallel. The tag 102 may use any appropriate combination and arrangement of logical elements implementing some or all of the described functionality.

Method 700 begins at step 702 where an RF signal is received. For example, the antenna 202 receives an RF signal. At step 704, a first capacitor is charged using energy from the received signal. In the example, the capacitor 402 is charged using at least a portion of the current induced in the antenna 202. If the first capacitor is not fully charged at decisional step 706, then execution returns to step 704. If the first capacitor is fully charged at decisional step 706, then, at step 708, a switch associated with a next capacitor is opened. Again in the example, a switch 404 associated with a next capacitor 406 is opened in response to at least a previous capacitor being charged. At step 710, the next capacitor is charged using the received signal. If the next capacitor is not fully charged at decisional step 712, then execution returns to step 710. If the next capacitor is fully charged at decisional step 712, then execution proceeds to decisional step 714. If the storage module 212 includes another capacitor at decisional step 714, then execution returns to step 708. If the storage module 212 does not include another capacitor, then the initial capacitor and the other capacitors are discharged in response to at least a time duration. Returning to the example, the transistors 404a-j are switched open to discharge charge the capacitors 402 and 404 in response to at least a time duration.

A number of embodiments of the invention have been described. Nevertheless, it will be understood that various modifications may be made without departing from the spirit and scope of the invention. Accordingly, other embodiments are within the scope of the following claims.

What is claimed is:
1. A Radio Frequency (RF) tag, comprising:
an antenna configured to receive an RF signal from any of a plurality of readers, wherein each reader is associated with a different protocol having different time durations;

a voltage rail configured to supply voltage to circuitry included in the RF tag; and a storage module coupled to the antenna and the voltage rail and configured to store energy associated with the RF signal in a plurality of different storage units and substantially maintain a voltage on the voltage rail during any of the different time durations independent of an internal power supply, the storage module substantially maintains the voltage on the voltage rail by selectively switching the voltage rail between the plurality of different storage units, wherein the selectively switching of the storage units corresponds to a particular time duration and protocol of the received signal.

2. The RF tag of claim 1, wherein the plurality of storage units comprise a plurality of capacitors, further comprising a plurality of transistors coupled to the capacitors and the antenna and configured to switch between open and closed.

3. The RF tag of claim 2, wherein the plurality of the capacitors are connected in parallel.

4. The RF tag of claim 2, wherein the plurality of transistors are configured to switch open during any of the different time durations to maintain current generated by the plurality of capacitors below a current threshold.

5. The RF tag of claim 2, wherein the plurality of transistors includes an initial transistor and a subsequent transistor having a higher current capacity than the first transistor.

6. The RF tag of claim 2, wherein the transistors are sequentially switched to sequentially charge associated capacitors.

7. The RF tag of claim 2, wherein the transistors limit the current below a certain current threshold during charging or discharging the plurality of capacitors.

8. The RF tag of claim 1, wherein the maintained voltage is 1.9 Volts (V) or greater.

9. A passive RFID tag, comprising:

an antenna configured to receive an RF signal from any of a plurality of readers, wherein each reader is associated with a different communication protocol having different time durations;

a voltage rail configured to supply voltage to circuitry included in the RF tag; and a storage module coupled to the antenna and the voltage rail and configured to store, in a plurality of storage units, energy from RF signals transmitted using any of the different communication protocols, the tag configured to backscatter responses using the stored energy and in accordance with any of the different communication protocols, the storage module substantially maintains the voltage on the voltage rail by selectively switching the voltage rail between the plurality of different storage units, wherein the selectively switching of the storage units corresponds to a particular time duration and protocol of the received signal.

10. The passive RF tag of claim 9, wherein the plurality of storage units comprises a plurality of capacitors, further comprising a plurality of transistors coupled to the capacitors and the antenna and configured to switch between open and closed.

11. The RF tag of claim 10, wherein the plurality of transistors are configured to switch open during any of the different time durations to maintain current generated by the plurality of capacitors below a current threshold.

12. The RF tag of claim 10, wherein the transistors are sequentially switched to sequentially charge associated capacitors.

13. A method, comprising:

receiving an RF signal from any of a plurality of readers, wherein each reader is associated with a different protocol having different time durations;

storing energy associated with the received RF signal in a plurality of different storage units; and substantially maintaining a voltage on a voltage rail of an RFID tag during any of the different time durations by selectively switching the voltage rail between the plurality of different storage units independent of an internal power supply, wherein the selectively switching of the storage units corresponds to a particular time duration and protocol of the received signal.

14. The method of claim 13, wherein storing energy comprises selectively switching a plurality of capacitors to store the energy.

15. The method of claim 14, wherein the plurality of the capacitors are connected in parallel.

16. The method of claim 14, further comprising switching the capacitors open during any of the different time durations to maintain current generated by the plurality of capacitors below a current threshold.

17. The method of claim 13, further comprising substantially maintaining a current in the tag below a certain current threshold during charging or discharging.

18. The method of claim 13, wherein the maintained voltage is 1.9 Volts (V) or greater.

19. A method, comprising:

receiving an RF signal from any of a plurality of readers, wherein each reader is associated with a different communication protocol having different time durations;

storing energy from the RF signal in a plurality of different storage units, wherein the RF signal is transmitted using any of the different communication protocols;

selectively switching a voltage rail of an RFID tag between the plurality of different storage units to maintain a voltage applied to circuitry of the RFID tag above a specified threshold, wherein the selectively switching of the storage units corresponds to a particular time duration and protocol of the received signal; and backscattering responses using the stored energy and in accordance with any of the different communication protocols.

20. The method of claim 19, wherein storing energy comprises selectively switching a plurality of capacitors to store the energy.

21. The method of claim 20, further comprising switching the capacitors open during any of the different time durations to maintain current generated by the plurality of capacitors below a current threshold.

22. The method of claim 19, further comprising substantially maintaining a current in the tag below a certain current threshold during charging or discharging.

* * * * *

UNITED STATES PATENT AND TRADEMARK OFFICE
CERTIFICATE OF CORRECTION

| | | |
|---|---|---|
| PATENT NO. | : 7,852,216 B2 | Page 1 of 1 |
| APPLICATION NO. | : 11/842556 | |
| DATED | : December 14, 2010 | |
| INVENTOR(S) | : Bruce B. Roesner | |

It is certified that error appears in the above-identified patent and that said Letters Patent is hereby corrected as shown below:

Column 9, claim 2, line 14,
Delete "2. The RF tag of claim 1, wherein the plurality of storage units comprise a plurality of capacitors, further comprising
       a plurality of transistors coupled to the capacitors and the antenna and configured to switch between open and closed." and
insert -- 2. The RF tag of claim 1, wherein the plurality of storage units comprise a plurality of capacitors, further comprising a plurality of transistors coupled to the capacitors and the antenna and configured to switch between open and closed. --, therefor.

Signed and Sealed this
Fifth Day of April, 2011

David J. Kappos
*Director of the United States Patent and Trademark Office*